Nov. 16, 1965 R. W. SANDERS 3,218,557

RECEIVER EMPLOYING PHASE-LOCKED CIRCUITS FOR MULTIPLEXED PHASE MODULATED TRANSMISSION SYSTEM

Filed Aug. 23, 1961 2 Sheets-Sheet 1

RAY W. SANDERS
INVENTOR.

BY Allen E. Botney

ATTORNEY

RAY W. SANDERS
INVENTOR.
BY Allen E. Botney
ATTORNEY

United States Patent Office 3,218,557

Patented Nov. 16, 1965

3,218,557

RECEIVER EMPLOYING PHASE-LOCKED CIRCUITS FOR MULTIPLEXED PHASE MODULATED TRANSMISSION SYSTEM

Ray W. Sanders, Los Angeles, Calif., assignor to Space-General Corporation, Glendale, Calif.

Filed Aug. 23, 1961, Ser. No. 133,447
4 Claims. (Cl. 325—346)

The present invention relates in general to the communications art and more particularly relates to a multiplexed system of signaling employing phase modulation, the transmitted information being uniquely reproduced by means of phase-locked circuits.

Important information is oftentimes received or obtained from the transmission of pulse trains. The present invention concerns itself with the multiplexing of such pulse trains, that is, with the simultaneous transmission of a pair of pulse trains on the same carrier wave. In essence, a pair of pulse trains having different pulse repetition rates are combined to form a single wave which varies between four different voltage levels. This last wave is then used to phase modulate a carrier, the phase shifts corresponding to the different voltage levels. At the receiver site, the modulated carrier is processed to reproduce the original pulse trains, phase-lock circuit theory being uniquely used in the demodulation process.

Accordingly, one object of the present invention is to provide a system of signaling involving the multiplexing process in connection with the transmission of pulse trains.

Another object of the present invention is to provide a signaling system in which phase-lock loop theory is significantly employed in the demodulation process.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
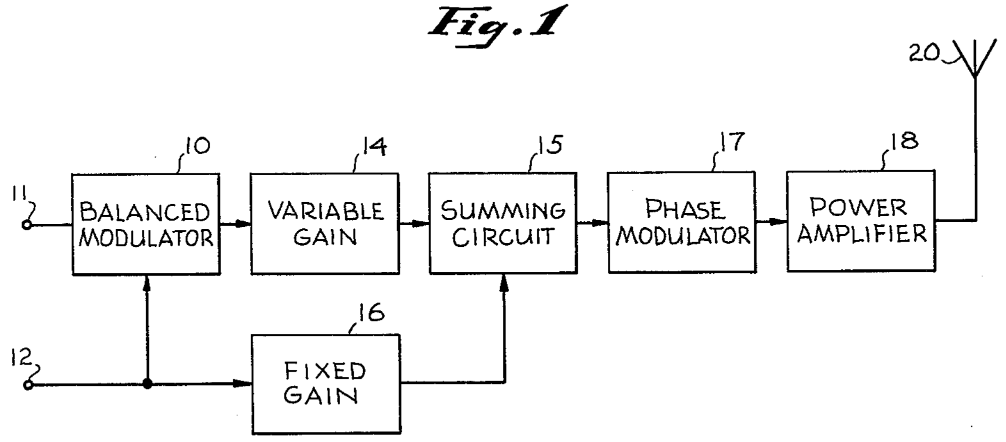
FIG. 1 is a block diagram illustrating the transmitter portion of a signaling system according to the present invention.
Figure 2:
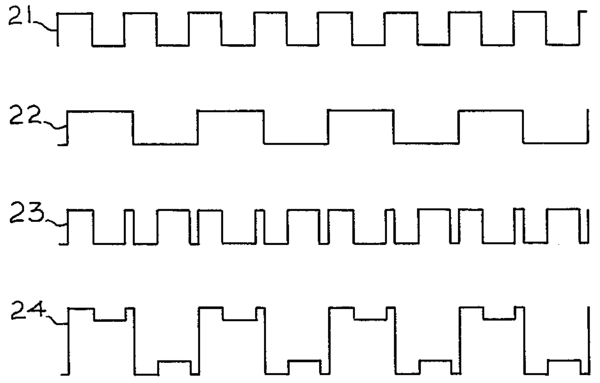
FIG. 2 is a flow chart illustrating the voltage waveforms existing at various points in the transmitter of FIG. 1.

Referring now to the drawings and in particular to FIGS. 1 and 2 therein, the transmitter is shown to include a balanced modulator 10 whose two inputs are connected to receive a pair of pulse trains at input terminals 11 and 12. The balanced-modulator output is connected through a variable gain device 14 to the first of two inputs to a summing circuit 15, the second input to the summing circuit being coupled through a fixed gain device 16 to input terminal 12. The summing circuit output is then fed to a phase modulator 17 in preparation for transmission, a power amplifier 18 being coupled between the phase modulator and an antenna 20.

In operation, two pulse trains having different pulse repetition rates are respectively applied to input terminals 11 and 12 and, therefore, to the two inputs to balanced-modulator 10, the pulses in these trains preferably varying between "0" and "1" levels. Examples of the types of pulse trains that may be applied to the balanced-modulator are shown as waveforms 21 and 22 in FIG. 2. As a result, the signal produced by the modulator is illustrated by waveform 23 in FIG. 2 and consists of a pulse train whose pulses also vary between "0" and "1" values but whose pulse durations are unequal.

More specifically, in accordance with the principles governing balanced-modulators, signal 23 has a "1" value whenever signals 21 and 22 simultaneously or coincidentally have "1" or "0" values, that is to say, whenever they are simultaneously at the same voltage level. On the other hand, signal 23 has a "0" value whenever signals 21 and 22 are at different voltage levels, that is, whenever one of these two signals has a "1" value and the other of them has a "0" value. The signals represented by waveforms 22 and 23 are applied to summing circuit 15 wherein they are linearly added. However, before being applied to the summing circuit, these signals are respectively passed through fixed and variable gain devices 16 and 14 so that their amplitudes may be adjusted to different values for the purpose of providing four different voltage levels in the signal produced at the output of the summing circuit and applied to phase-modulator 17. More particularly a phase modulator is a device that will shift the phase of a carrier, i.e., phase-modulate a carrier, according to the level of the D.C. voltage applied to it. As will be seen later, four different phase shifts are imposed upon a carrier in the embodiment being described, with the result that four different voltage levels must be applied to the phase modulator. To achieve this result, waveform 23 is applied to variable gain device 14 whose gain has been increased to sufficiently amplify signal 23 so that, when signal 23 is added to signal 22 in summing circuit 15, a waveform having the desired four different voltage levels, such as waveform 24, is produced. An example of the kind of waveform that may be obtained at the output of the summing circuit and that may be applied to the phase-modulator is illustrated by waveform 24 in FIG. 2.

In phase-modulator 17 a carrier is subjected to any one of four possible phase shifts, the particular phase shift experienced by the carrier at any one time depending upon the voltage level of signal 24 at that time. By way of example, the four phase-shift angles may be $$\pm\frac{\pi}{2}\pm\alpha$$

Thus, again by way of example, the carrier out of the phase-modulator may at any time be any one of the following, namely:

$$A \sin\left(\omega t+\frac{\pi}{2}+\alpha\right)$$

$$A \sin\left(\omega t+\frac{\pi}{2}-\alpha\right)$$

$$A \sin\left(\omega t-\frac{\pi}{2}+\alpha\right)$$

and $$A \sin\left(\omega t-\frac{\pi}{2}-\alpha\right)$$

Following the step of phase modulation, the carrier signal is power-amplified in circuit 18 and thereafter applied to antenna 20 for radiation into space.

Figure 3:
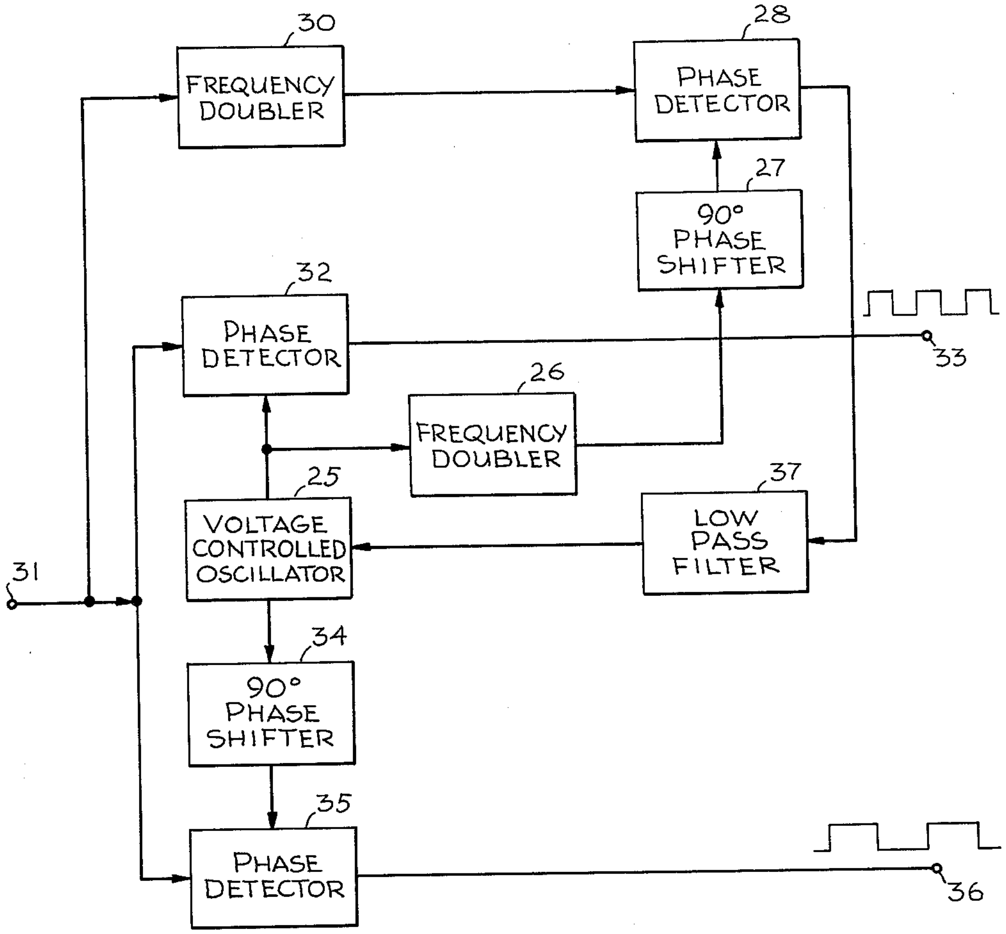
FIG. 3 is a block diagram illustrating the receiver portion of a signaling system according to the present invention.

Reference is now made to the receiver portion of the system in FIG. 3, which is shown to include a voltage-controlled oscillator 25 that is connected through a frequency doubler 26 and thereafter through a 90° phase shifter 27 to the first of two inputs to a phase detector 28. A frequency doubler 30 is also connected between the first input to phase-detector 28 and the input to the receiver, namely, an input terminal 31. In addition to being connected to frequency doubler 26, voltage-controlled oscillator 25 is also connected to the first of two inputs to a phase detector 32 whose other input is connected to input terminal 31, the output of this phase detector being one of the two outputs for the receiver and is designated 33. Again, voltage-controlled oscillator 25 is coupled through a 90° phase shifter 34 to still another phase detector circuit 35, this last detector circuit also being connected between input terminal 31 and the second output for the receiver which is designated 36. Finally, a suitable low pass filter 37 is coupled between the output end of phase detector 28 and the input end of oscillator 25.

In considering the operation, it is briefly stated that transmissions are received at input terminal 31 and, after being processed, waveforms 21 and 22 generated at the transmitter site are reproduced at output terminals 33 and 36, respectively. More particularly, upon receipt, the transmitted phase-modulated carrier is applied to frequency doubler 30, with the obvious results that the signal applied to phase detector 28 is at twice the frequency of the incoming signal. Furthermore, due to the frequency doubling step, the four phase-shift angles are now $$+\pi+2\alpha$$
$$+\pi-2\alpha$$
$$-\pi+2\alpha$$

and $$-\pi+2\alpha$$

At the same time, the signal out of voltage-controlled oscillator 25, which signal is at the same frequency as the transmitted carrier, is applied to frequency doubler 26 and then to 90° phase shifter 27 wherein, as is implied, the frequency of the oscillator signal is doubled and its phase shifted by 90° before being applied to phase detector 28. Under conditions where the carrier received at input terminal 31 is unmodulated, the carrier and oscillator signals not only have the same frequency but are quickly brought into phase with each other, with the result that the two signals applied to phase detector 28 are at the same frequency but out of phase with each other by an angle of $$\frac{\pi}{2}$$

degrees.

Since a phase detector circuit produces a maximum output voltage when the signals applied to it are in phase and a zero output when the signals applied to it are $$\frac{\pi}{2}$$

degrees out of phase, the output from phase detector 28 would be substantially zero under the conditions mentioned. However, where the received carrier is phase-modulated as herein, the two signals applied to phase detector 28 have the same frequency but are out of phase with each other by the angles $$\frac{\pi}{2}\pm 2\alpha$$

degrees. It will therefore be obvious to those skilled in the art that the signal out of phase detector 28 and passed through low pass filter 37 will fluctuate between two limits corresponding to $\pm 2\alpha$. It will also be recognized that in response to the signal out of low pass filter 37 that the phase of the voltage-controlled oscillator signal will correspondingly be shifted $\pm\alpha$ degrees. In other words, the signal applied to phase detector 32 and to phase shifter 34 is constantly being phase shifted by $\pm\alpha$ degrees. Since the phase modulated carrier is also applied to phase detector 32, the signal out of the detector and finally reproduced at output terminal 33 is that of waveform 21 in FIG. 2, which waveform was instrumental in producing the $\pm\alpha$ phase shifts at the transmitter site.

The transmitted carrier is also applied to phase detector 35 to which is further applied the output from voltage-controlled oscillator 25 after that output has been passed through 90° phase shifter 34. Since the oscillator signal has previously experienced $\pm\alpha$ phase shifts, it will be recognized that the two signals applied to phase detector 35 therefore tend to be in phase with each other, with the result that the phase-detector output signal reproduced at output terminal 36 is substantially a duplicate of waveform 22 in FIG. 2, which waveform was used to produce the $$\pm\frac{\pi}{2}$$

phase shifts in the carrier at the transmitter site. It is thus seen that information signals 21 and 22 applied to the transmitter are reproduced by the receiver.

Having thus described the invention, what is claimed as new is:

1. In a signaling system, a receiver for reproducing first and second pulse trains in response to a phase-modulated carrier signal applied thereto and having carrier phase shifts of $$\pm\frac{\pi}{2}\pm\alpha$$

degrees, where $\alpha$ is an angle between zero and 90°, said receiver comprising: first and second phase detector circuits coupled to receive the phase-modulated carrier signal; a voltage-controlled oscillator for producing a local signal at the same frequency as the phase-modulated carrier, said oscillator being coupled to said first phase detector for applying said local signal thereto; a first phase-shifter circuit coupled between said oscillator and said second phase detector for shifting the phase of the local signal applied to said second detector by $$\frac{\pi}{2}$$

degrees; a third phase-detector network; a first frequency-doubler circuit coupled to receive the phase-modulated carrier signal and to apply the output therefrom to said third phase detector; a second phase-shifter circuit for shifting the phase of signals applied thereto by $$\frac{\pi}{2}$$

degrees, said second phase-shifter circuit being coupled to said third phase detector; a second frequency-doubler circuit coupled to receive said local signal and to apply the output therefrom to said second phase-shifter circuit; and a low-pass filter coupled between said third phase-detector network and said voltage-controlled oscillator, the first and second pulse trains respectively being produced at the output terminals of said first and second phase-detector networks.

2. A signaling system for the transmission and reception of first and second pulse trains, said system comprising: a transmitter including means receptive of the first and second pulse trains and operable in response thereto to produce a third pulse train whose amplitude varies between four different voltage levels, and output apparatus for radiating a phase-modulated carrier signal, said apparatus being coupled to receive said third pulse train and operable in response thereto to produce carrier phase shifts of $$\pm\frac{\pi}{2}\pm\alpha$$

degrees respectively corresponding to the four different voltage levels of said third pulse train, where $\alpha$ is an angle between zero and 90°; and a receiver including first and second phase detector circuits coupled to receive the phase-modulated carrier, a voltage-controlled oscillator for producing a local signal at the same frequency as the phase-modulated carrier, said oscillator being coupled to said first detector for applying said local signal thereto, a first phase-shifter circuit coupled between said oscillator and said second phase detector for shifting the phase of the local signal applied to said second detector by $$\frac{\pi}{2}$$

degrees, a third phase detector network, a first frequency doubler circuit coupled to receive the phase-modulated carrier signal and to apply the output therefrom to said third phase detector, a second phase-shifter circuit for shifting the phase of signals applied thereto by $$\frac{\pi}{2}$$

degrees, said second phase-shifter circuit being coupled to said third phase detector, a second frequency doubler circuit coupled to receive said local signal and to apply the output therefrom to said second phase-shifter circuit, and a low-pass filter coupled between said third phase detector network and said voltage-controlled oscillator, the first and second pulse trains respectively being produced at the output terminals of said first and second phase detector networks.

3. A signaling system for the transmission and reception of first and second pulse trains, said system comprising: a transmitter including a balanced modulator receptive of the pulse trains and operable in response thereto to produce a third pulse train whose pulses occur whenever the pulses of the first and second pulse trains coincide in time, means for adding the second and third pulse trains to produce a fourth pulse train, said means including circuits for adjusting the amplitudes of said second and third pulse trains in such a manner that said fourth pulse train varies between four different voltage levels, and output apparatus for radiating a phase-modulated carrier signal, said apparatus being coupled to receive said fourth pulse train and operable in response thereto to produce carrier phase shifts of $$\pm\frac{\pi}{2}\pm\alpha$$

degrees respectively corresponding to the four different voltage levels of said fourth pulse train, where $\alpha$ is an angle between zero and 90°; and a receiver including first and second phase detector circuits coupled to receive the phase-modulated carrier signal, a voltage-controlled oscillator for producing a local signal at the same frequency as the phase-modulated carrier, said oscillator being coupled to said first phase detector for applying said local signal thereto, a first phase-shifter circuit coupled between said oscillator and said second phase detector for shifting the phase of the local signal applied to said second detector by $$\frac{\pi}{2}$$

degrees, a third phase-detector network, a first frequency-doubler circuit coupled to receive the phase-modulated carrier signal and to apply the output therefrom to said third phase detector, a second phase-shifter circuit for shifting the phase of signals applied thereto by $$\frac{\pi}{2}$$

degrees, said second phase-shifter circuit being coupled to said third phase detector, a second frequency-doubler circuit coupled to receive said local signal and to apply the output therefrom to said second phase-shifter circuit, and a low-pass filter coupled between said third phase-detector network and said voltage-controlled oscillator, the first and second pulse trains respectively being produced at the output terminals of said first and second phase-detector networks.

4. The transmitter defined in claim 3 wherein said means includes a summing circuit for linearly adding signals applied to it; a fixed gain device coupled to apply the second pulse train with a predetermined amplitude to said summing circuit; and a variable gain device coupled between said balanced modulator and said summing circuit for adjusting the amplitude of said third pulse train in such a manner that said fourth pulse train is produced by said summing circuit.

References Cited by the Examiner

UNITED STATES PATENTS

| | | | |
|---|---|---|---|
| 2,905,812 | 9/1959 | Doelz | 343—203 |
| 3,028,487 | 4/1962 | Losee | 325—346 |
| 3,048,658 | 8/1962 | Buff | 178—66 |

DAVID G. REDINBAUGH, *Primary Examiner.*

NEIL C. READ, *Examiner.*